H. W. & A. G. GRIBLER.
BEET BLOCKER.
APPLICATION FILED MAY 15, 1913.
1,089,210.
Patented Mar. 3, 1914.
2 SHEETS—SHEET 2.
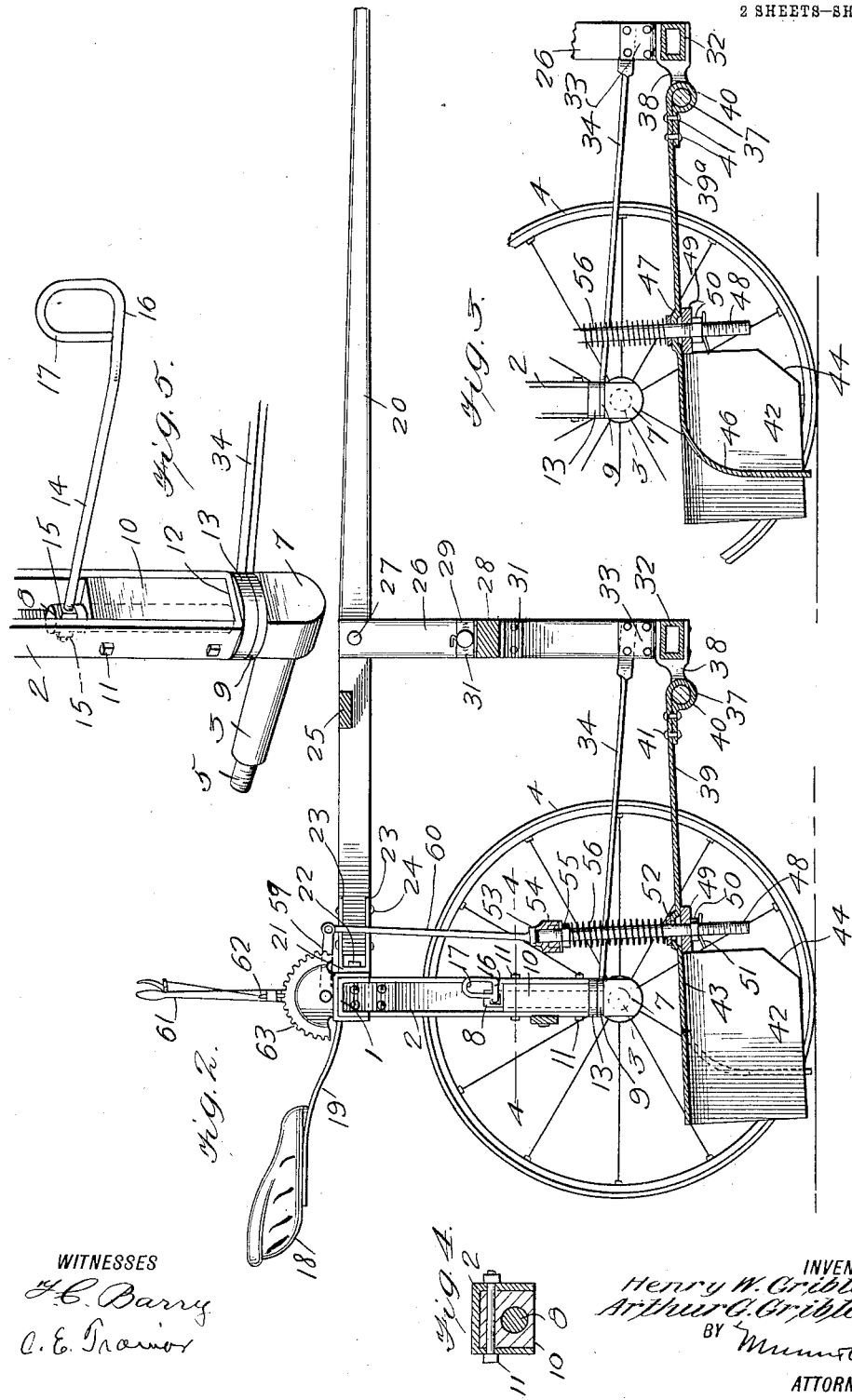
WITNESSES
J. C. Barry
C. E. Trainor
INVENTORS
Henry W. Gribler
Arthur G. Gribler
BY Munn & Co.
ATTORNEYS

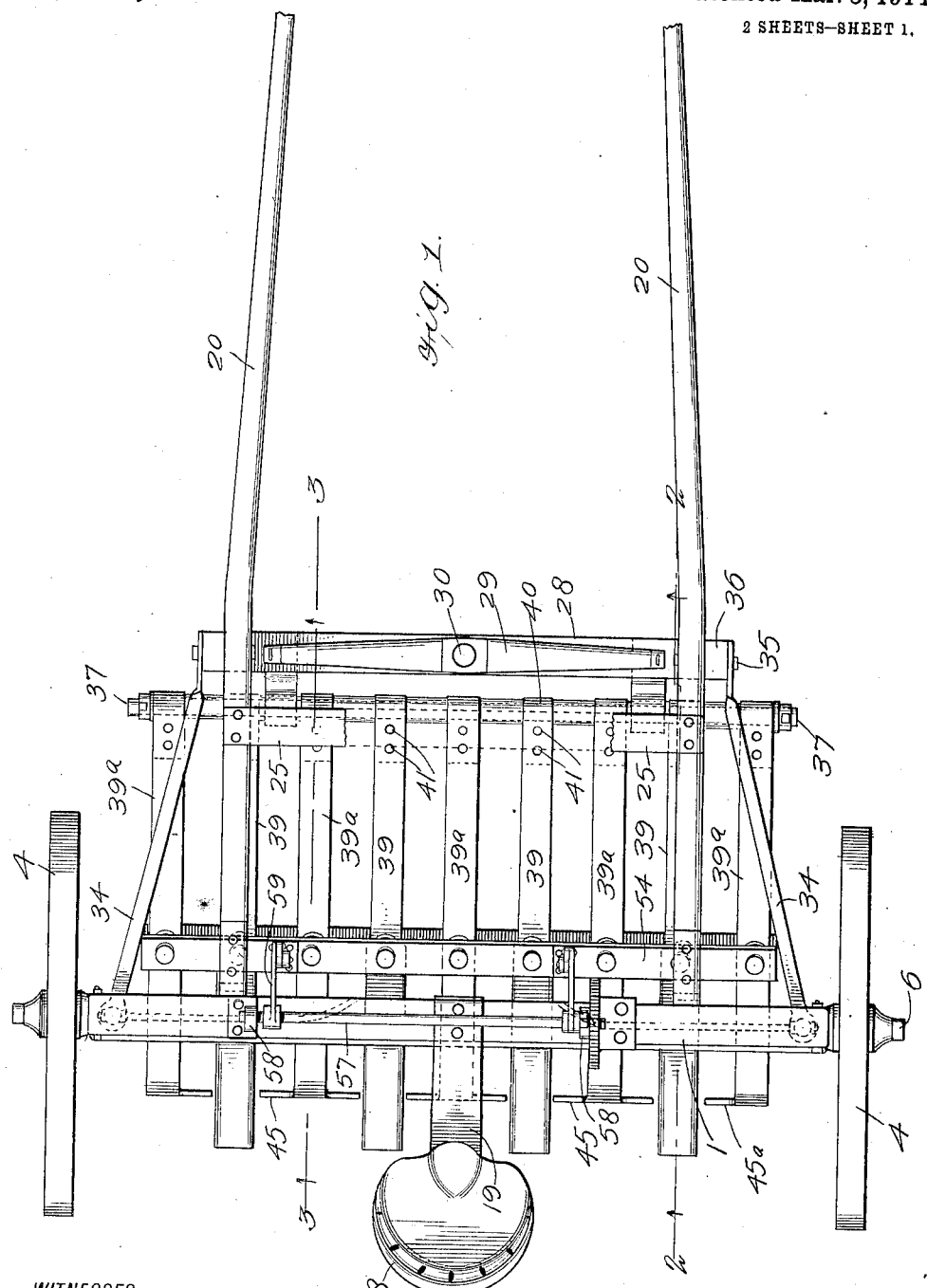

UNITED STATES PATENT OFFICE.

HENRY W. GRIBLER AND ARTHUR G. GRIBLER, OF VAN WERT, OHIO.

BEET-BLOCKER.

1,089,210. Specification of Letters Patent. Patented Mar. 3, 1914.

Application filed May 15, 1913. Serial No. 767,754.

*To all whom it may concern:*

Be it known that we, HENRY W. GRIBLER and ARTHUR G. GRIBLER, citizens of the United States, and residents of Van Wert, in the county of Van Wert and State of Ohio, have made certain new and useful Improvements in Beet-Blockers, of which the following is a specification.

Our invention is an improvement in beet cultivators, and has for its object to provide a cultivator of the character specified, especially adapted for cultivating beets in the field in the opposite direction from the direction of the beets in the row, and wherein mechanism is provided for protecting the plants during the cultivating operation.

In the drawings: Figure 1 is a plan view of the improved cultivator; Figs. 2 and 3 are sections on the lines 2—2, and 3—3, respectively, of Fig. 1; Fig. 4 is a section on the line 4—4 of Fig. 2; and, Fig. 5 is a perspective view of one of the spindles and its support looking at the inner end of the same.

The present embodiment of the invention comprises a substantially U-shaped main frame composed of channel material, and comprising a body portion 1, having at each end a depending arm 2. A spindle 3 is connected with each arm in a manner to be described, and a wheel 4 is journaled on each spindle. The outer end of each of the spindles is reduced, and screw-threaded, as shown at 5, and a nut 6 is threaded onto said reduced end for holding the wheel in place.

Each of the spindles is provided at its inner end with an enlargement or head 7, and an upwardly extending journal pin 8 is provided in connection with each head, the said pin extending at right angles to the spindle 3. A washer 9, which acts as the lower section of a fifth wheel or turn table, is journaled on the pin 8, the said washer being connected with a brace, to be later described. Block 10 is secured in the lower end of each arm by means of bolts 11, the said block filling the channel of the lower end of each arm. The channel material of which the body and the arms is composed is arranged with the channel downward on the body and inward on the arms, and the side walls of the channel of each arm are connected by a transverse integral web 12 at the lower end thereof, and the block 10 rests upon the web 12.

Each block has a longitudinal opening through which the journal pin 8 of the adjacent spindle extends, and the upper section 13 of the fifth wheel or turn table 9—13 is connected with the under face of the web 12, before mentioned. The upper end of the journal pin 8 extends above the upper end of the block 10, and the outer threaded end of a rod 14 is passed through the said upper end, and the rod is engaged by lock nuts 15 on each side of the pin. Each of the rods or links 14 extends inward, and the free end thereof is bent forwardly, as indicated at 16, and is provided with an integral stirrup 17, the rod being bent to form the stirrup.

A seat 18 is connected with the body 1 of the main frame by means of a spring plate 19, and the stirrups 17 are in position for engagement by the feet of the driver seated in the seat 18. By swinging the links 14 in the proper direction by means of the stirrups, the planes of the wheels 4, with respect to the direction of motion of the machine, may be changed whereby to guide the machine.

A pair of shafts 20 is connected to the body of the frame, by means of clips, each of the said clips being approximately U-shaped, and comprising a body 21 bolted to the body of the machine frame by a bolt 22, and arms 23 extending along the upper and lower faces of the shaft, and secured to the shaft in countersunk recesses, by means of bolts or rivets 24. The shafts are connected in front of the main frame by means of a cross plate 25, and in front of the cross plate each shaft is provided with a depending arm 26, the said arm being bolted to the shaft by a bolt 27. The arms are connected intermediate their ends by means of a cross plate 28, and a swingletree 29 is pivoted at its center to the cross plate, by means of a bolt 30. The cross plate is connected to the arms 26, by means of angle plates 31, the said plates being arranged at each end of the plate 28 and above and below the same. Thus the swingletree 29 is supported below the shafts, and at about the level of the stirrups 17. At their lower ends, the arms 26 are connected by means of a cross bar 32, the said bar being tubular in form, and connected to the arms by angle plates 33. A brace 34 extends from each washer 9, before mentioned to the adjacent arm 26, the front end of each of the said braces being given a quarter turn, and bolted to the arm by a bolt 35. A block 36 is arranged between the front end of each brace and the adjacent arm, for spacing the brace outwardly away from the arm.

Each of the braces 34 is integral with the lower section 9 of the turn table or fifth wheel 9—13, before mentioned. A shaft 37 is arranged behind the cross bar 32, and is supported by the said cross bar, the cross bar having rearwardly extending arms 38 for supporting the shaft. The shaft 37 has connected therewith a plurality of series of plows or cultivators and fenders, to be later described in detail, each of the said devices having a forwardly extending beam 39 for the fenders and 39ª for the cultivators or plows. Each beam is provided with a bearing 40 at its front end for engaging the shaft. Each of the said bearings 40 is formed by bending the front end of the beam into shape, the extremity of the beam being secured to the body thereof by means of rivets 41, or the like.

The ends of the shaft 37 are extended beyond the braces 34, as shown, so that the cultivating devices extend practically the full length of the body of the main frame. The fenders are alternately arranged with respect to the plows, and each fender is substantially U-shaped in cross section, consisting of spaced parallel depending wings or vanes 42 connected by an integral web 43 at their top, the web 43 being continuous and integral with the beam 39 before mentioned. The lower front corner of each of the said wings or vanes 42 is cut away on a bevel, as indicated at 44.

The plows are of approximately T-shape, the body 45 of the T being in position to engage the ground, while the stem 46 thereof extends upwardly and curves forwardly to merge with the beam 39ª. The lower edges of the blades or bodies 45 of the T extend below the lower edges of the wings or vanes 42, as shown in Figs. 2 and 3, and the outermost plows differ slightly from the intermediate plows.

The plows are five in number, while the fenders are but four in number. Thus the outermost device at both sides of the machine is a plow, and the said plows differ from the other plows, by being of L-shape instead of T-shape. The said plows are formed with a single laterally extending lug 45ª, instead of with the two lugs 45 of the intermediate plows.

Each of the beams 39 and 39ª is provided at its junction with the connecting web 43 or with the stem 46, as the case may be, with a perforated boss 47, and the lower end of a threaded rod 48 extends through the said boss. A washer 49 encircles each rod below the beam, and a nut 50 is threaded onto the rod below the washer. A cotter pin 51 is passed transversely of each rod below the nut to lock the same in place. A washer 52 encircles each of the rods above the beam, and each rod is provided with an integral head at its upper end. Each rod passes through a cross bar 54 at its upper end, the head 53 being above the bar, and a nut 55 is threaded onto each rod below the bar. A coil spring 56 encircles each rod between the nut 55 and the washer 52, the spring acting normally to press the cultivating device downwardly.

A rock shaft 57 is journaled in bearings 58 on the upper face of the body of the main frame, and the said shaft is provided near each end with forwardly extending arms 59. Each arm 59 is connected to the cross bar 54 by means of a link 60, and the rock shaft has secured to one end thereof a lever 61. The lever is provided with a latch mechanism 62 coöperating with the toothed segment 63 secured to the body of the main frame, for holding the lever in adjusted position, and the said lever is adjacent to the right hand of the driver on the seat.

In operation, the device is drawn through the field, being guided by the operator, by means of the stirrups 17 and the mechanism connected therewith. By means of the lever 61 the cultivating devices may be adjusted toward or from the ground, and should any of the said devices meet with an obstruction, as for instance a stone, the said devices may move upwardly, compressing the spring 56, to prevent injury to the particular device which engages the obstruction. Each of the devices 42—43—44 is a fender, the said devices passing over the beets, with the said beets between the vanes or wings 42, so that the blades 45 of the cultivating devices proper cannot touch the said beets, nor can they cover them with dirt.

We claim:—

In a cultivator, a main frame, wheels for supporting the main frame, a shaft arranged transversely of the main frame in front of the wheels, a series of plows, each having a forwardly extending beam journaled on the shaft, each of the said plows having a cultivator blade at the rear end thereof and below the beam and transverse thereto, a fender substantially U-shaped in cross section between each adjacent pair of plows, each fender having a forwardly extending beam journaled on the shaft, a bar arranged transversely of the main frame above the beams, means on the main frame for raising and lowering the bar, a rod for each beam, each rod being connected with the bar at its upper end, and extending through an opening in the adjacent beam, a stop on the rod below the beam, and a spring between the bar and the beam.

HENRY W. GRIBLER.
ARTHUR G. GRIBLER.

Witnesses:
N. R. CARTER,
WILLIAM McGIRR.

Copies of this patent may be obtained for five cents each, by addressing the "Commissioner of Patents, Washington, D. C."